(12) United States Patent
Wilbur et al.

(10) Patent No.: US 8,221,252 B2
(45) Date of Patent: Jul. 17, 2012

(54) BOWLING BALL WITH INDICIA AND METHOD THEREFOR

(75) Inventors: W. Scott Wilbur, Norton Shores, MI (US); David Wilbur, Nunica, MI (US); Harold Thommen, III, Whitehall, MI (US); Kevin Keck, Hart, MI (US)

(73) Assignee: Scoda America, Inc., Muskegon, MI (US)

( * ) Notice: Subject to any disclaimer, the term of this patent is extended or adjusted under 35 U.S.C. 154(b) by 248 days.

(21) Appl. No.: 12/402,727

(22) Filed: Mar. 12, 2009

(65) Prior Publication Data

US 2009/0309255 A1 Dec. 17, 2009

Related U.S. Application Data

(60) Provisional application No. 61/102,949, filed on Oct. 6, 2008, provisional application No. 61/060,910, filed on Jun. 12, 2008.

(51) Int. Cl.
*A63B 37/06* (2006.01)
(52) U.S. Cl. .......................................... 473/125
(58) Field of Classification Search .................. 473/125, 473/126; 40/327
See application file for complete search history.

(56) References Cited

U.S. PATENT DOCUMENTS

| | | | |
|---|---|---|---|
| 2,291,738 A | | 8/1942 | Luth et al. |
| 2,839,853 A | * | 6/1958 | Giangreco .................. 40/327 |
| 3,248,113 A | | 4/1966 | Baggenstoss et al. |
| 3,364,607 A | * | 1/1968 | Twickler .................. 40/327 |
| 3,764,435 A | * | 10/1973 | Dworak .................. 156/257 |
| 3,879,876 A | | 4/1975 | Morgan |
| 4,121,828 A | | 10/1978 | Amburgey |
| 4,320,899 A | | 3/1982 | Salvino |
| 4,655,454 A | | 4/1987 | Amburgey |
| 4,875,410 A | | 10/1989 | Lee et al. |
| 4,890,835 A | | 1/1990 | Calhoon |
| 4,913,429 A | | 4/1990 | Fabanich |
| 5,074,553 A | | 12/1991 | Pawlowski et al. |
| 5,125,656 A | | 6/1992 | Fabanich |
| 5,218,545 A | * | 6/1993 | Takehara .................. 701/37 |
| 5,257,806 A | | 11/1993 | Linden |
| 5,409,334 A | | 4/1995 | Edis et al. |
| 5,503,699 A | * | 4/1996 | Ratner et al. .................. 156/156 |
| 5,509,659 A | * | 4/1996 | Igarashi .................. 473/345 |
| 5,607,268 A | | 3/1997 | Edis et al. |
| 5,634,749 A | | 6/1997 | Edis et al. |
| 6,209,605 B1 | | 4/2001 | Lee et al. |
| 6,248,804 B1 | | 6/2001 | Lutz |
| 6,524,419 B1 | | 2/2003 | Dabrowski, Jr. et al. |
| 6,691,759 B2 | | 2/2004 | Dabrowski, Jr. et al. |
| 6,743,109 B2 | | 6/2004 | Kammerer, Jr. et al. |
| 7,052,406 B2 | * | 5/2006 | Suzuki .................. 473/119 |

* cited by examiner

*Primary Examiner* — William Pierce
(74) *Attorney, Agent, or Firm* — Flynn, Thiel, Boutell & Tanis, P.C.

(57) ABSTRACT

A bowling ball with an indicia is provided. A method for manufacturing such a bowling ball is also provided. The indicia may be preformed and attached to the core of the bowling ball before the outer layer of the bowling ball is created.

14 Claims, 5 Drawing Sheets

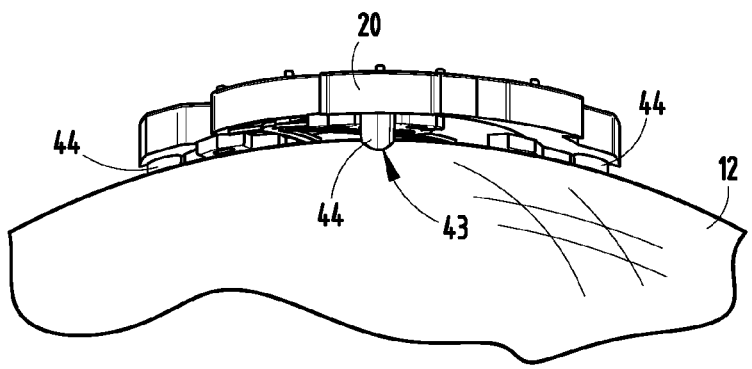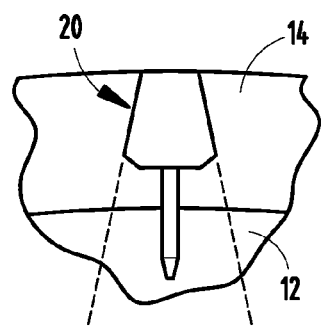
FIG. 5    FIG. 5A
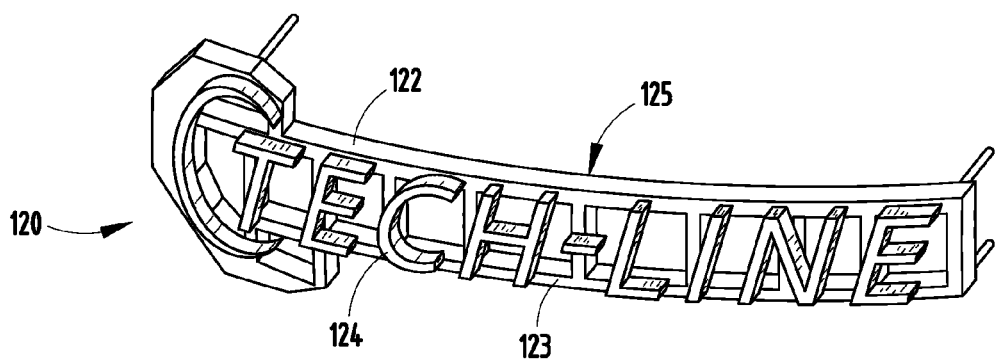
FIG. 6
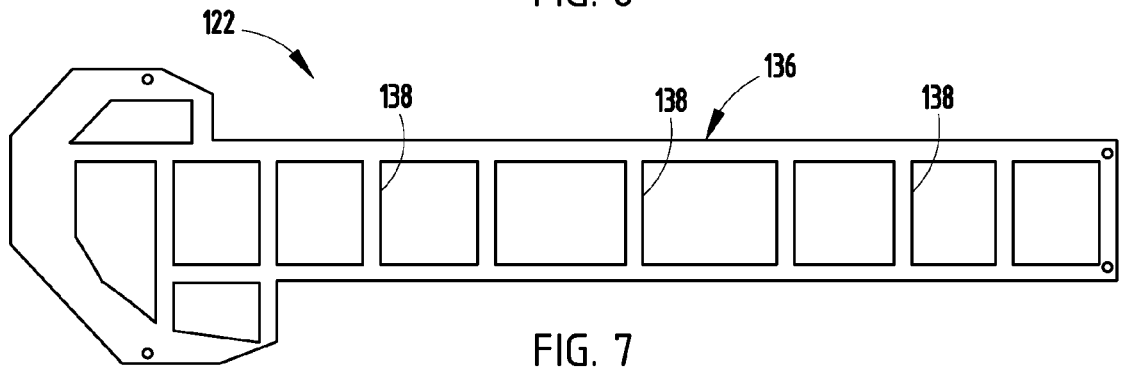
FIG. 7
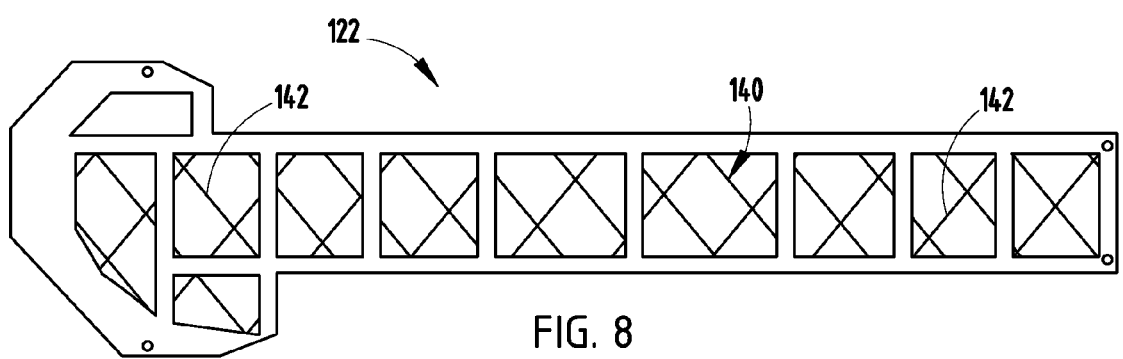
FIG. 8

BOWLING BALL WITH INDICIA AND METHOD THEREFOR

This claims priority to U.S. Provisional Application No. 61/102,949 entitled "Bowling Ball with Indicia and Method Therefor," filed Oct. 6, 2008, the entire disclosure of which is incorporated herein by reference, and claims priority to U.S. Provisional Application No. 61/060,910, entitled "Bowling Ball with Engraving and Method Therefor," filed Jun. 12, 2008, the entire disclosure of which is incorporated herein by reference.

BACKGROUND OF THE INVENTION

The present invention relates to bowling balls and, in particular, indicia on the surface of bowling balls and methods for manufacturing a bowling ball with such indicia.

Bowling balls have been in existence for many years. While, generally speaking, all that is necessary for a bowling ball is to have an outer layer, and, usually a core and eventually thumb and finger holes, many manufacturers and sellers of bowling balls wish to have one or more visual indicia on the outer surface of the outer cover or "veneer" of the bowling ball. The visual indicia can include a variety of things, but very commonly includes the name and/or logo of the brand or model of bowling ball.

Current or previous methods of providing indicia on bowling balls include forming the complete ball, then engraving or etching a portion of the surface of the ball and filling in the engraved or etched portion with a different colored substance than the surface of the ball. The filled indicia is a series of narrow lines. The filler is most often a different substance than the outer layer of the ball, potentially causing weight distribution problems, cracking or breaking away of the filler, non-flush surfaces, and/or changes in the contact friction with the lane surface while the ball is rolling. Also, if a mistake is made in etching, the entire ball may be wasted. The process of filling in an etched or engraved area may also trap air between the filler and engraved portion, potentially causing problems when the ball is used.

Another method of providing indicia on the surface of the ball is to provide a "window" of clear or colored transparent material with a flat screen print beneath the window substance. A person could thus see through the transparent portion, which extends to the surface of the ball, to the flat, screen printed indicia beneath. However, the window is typically not the same substance as that used in the outer layer of the ball. Such a window ball typically has weight distribution issues due to the creation of a flat surface on a portion of the core to which the screen print is attached. Also, such a method provides a bowling ball that is too brittle and unstable to meet typical durability requirements and is usually used for visual appearance and display only. Also, if additional indicia were desired, the ball would normally include the engraving discussed above, adding even more steps and expense to the manufacture of the ball.

Another method uses a simple locator pin that is visible on the outer surface of the ball. Such a pin may or may not be adjacent to or touch the core, but it is small and simply-shaped, and designed only to convey the position of the core in the ball as a point of reference for drilling.

These methods require additional steps to the steps required to manufacture the ball, which may include etching and filling in the etching or cavity, drilling, cutting off a portion of the core, attaching multiple pieces to the core or outer layer of the ball, and then re-sanding or re-grinding the bowling ball. These methods also create playability and durability issues for the bowling ball.

Accordingly, a method that does not require all of these steps would be preferable so that a cost-effective bowling ball could be easily made having indicia on its surface, while maintaining appropriate weight distribution of the ball. Additionally, the method would create a bowling ball having indicia with broad lines and solid colored areas, if desired.

SUMMARY OF THE INVENTION

One aspect of the present invention is a method of manufacturing a bowling ball. The method comprises the steps of providing a mold, the mold having an outer shell with an inner wall, placing an indicia member within the mold against the inner wall of the outer shell, and molding material about the indicia member to form a bowling ball.

Another aspect of the present invention is a bowling ball comprising a core, a preformed indicia having at least one post and an outer member, and an outer layer adjacent the core and the preformed indicia. The preformed indicia is attached to the core by at least one post, and there is a gap between the core and the outer member of the preformed indicia.

Yet another aspect of the present invention is a method of manufacturing a bowling ball comprising the steps of providing a manufacturing machine having a cavity with an inner wall, providing a ball core, forming a surface graphic, placing the ball core and surface graphic into the cavity, forming a cover stock about the core and surface graphic, and removing cover stock material to reveal the surface graphic as an indicia at the outer surface of the bowling ball.

Still another aspect of the present invention is a method of manufacturing a bowling ball comprising the steps of forming a graphic of a thermoplastic or thermoset plastic, inserting the graphic into a mold cavity, forming cover stock about the graphic while the graphic is in the mold cavity, and removing material from the cover stock to reveal the graphic.

Yet still another aspect of the present invention is another method of manufacturing a bowling ball. This method comprises the steps of providing a bowling ball core, holding a preformed indicia in suspension from the core, and molding a cover about the core and preformed indicia.

These and other features, advantages, and objects of the present invention will be further understood and appreciated by those skilled in the art by reference to the following specification, claims and appended drawings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 is a side elevational view of a portion of a bowling ball core and the indicia member of FIG. 2;

FIG. 5A is a partial cross-sectional view of a bowling ball with an indicia member;

FIG. 6 is a perspective view of an indicia member for use with the present invention;

FIG. 7 is an elevational view of a backing member of the indicia member of FIG. 6;

FIG. 8 is an elevational view of an alternative embodiment of a backing member of the indicia member of FIG. 6;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Figure 3:
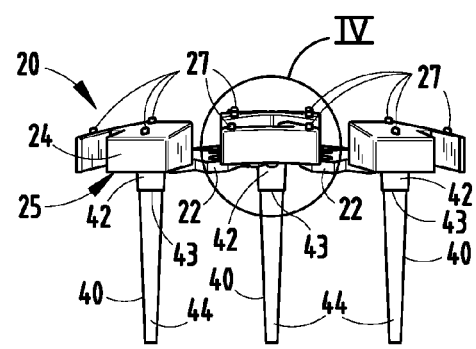
FIG. 3 is a side elevational view of the indicia member of FIG. 2.

For purposes of description herein, the terms "outer," "inner," "top," and "bottom" and derivatives thereof shall relate to the embodiment as oriented in FIG. 3. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts. Hence, specific dimensions and other physical characteristics relating to the embodiments disclosed herein are not to be considered as limiting.

Figure 1:
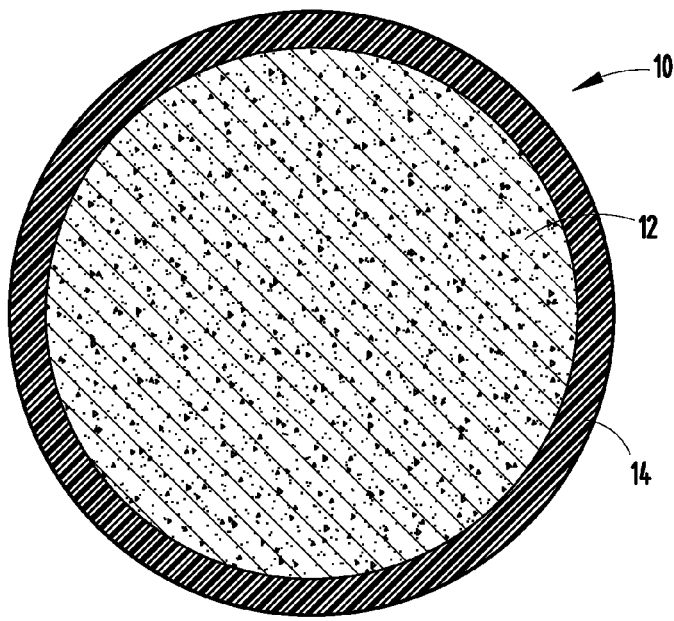
FIG. 1 is a cross section elevational view of a bowling ball.

FIG. 1 shows a standard bowling ball 10. Bowling ball 10 includes a core 12 and an outer layer 14. Once completely finished and ready for use, the manufacturer or the user may also drill one or more thumb and finger holes (not shown) into the outer layer 14 of the bowling ball 10.

Figure 2:
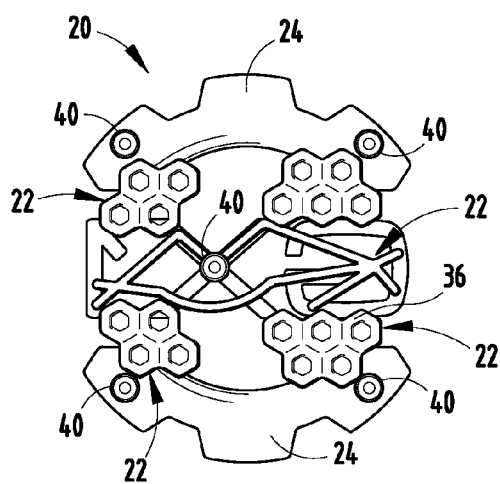
FIG. 2 is bottom plan view of an indicia member for use with the present invention.

The preferred bowling ball of the present invention also includes an indicia member. The indicia member is preferably preformed and is shown generally in FIGS. 2-4. The indicia member of the first embodiment is denoted by the reference numeral 20. The indicia member 20 includes two general parts, and is preferably curved to have substantially the same curvature as the ball so that the indicia member is a constant surface from the core 12, and so that its outer surface 23 has the same curvature of the outer layer.

Figure 4:
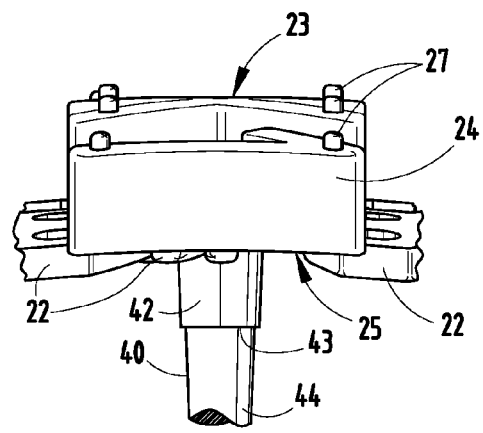
FIG. 4 is a partial side elevational view of the indicia member of FIG. 2, also denoted in FIG. 3 as portion IV.
Figure 9:
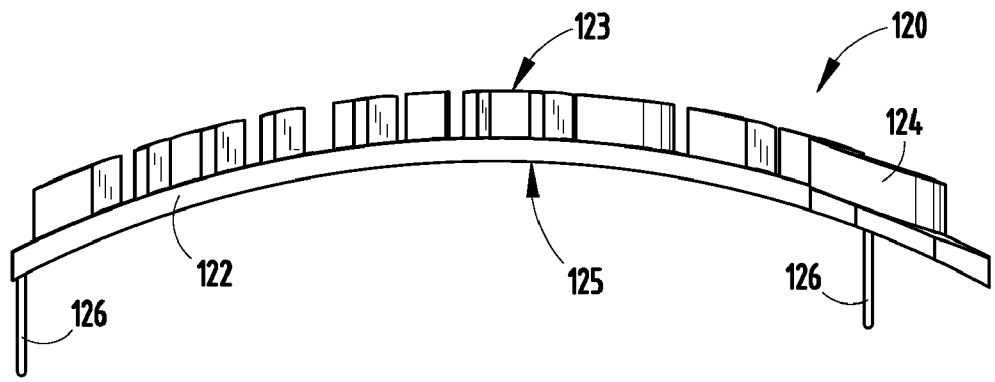
FIG. 9 is a side elevational view of the indicia member of FIG. 6.

The first general part is a backing member 22 that provides the basic structure and foundation of indicia member 20. Backing member 22 is preferably shaped so that backing member 22 can adequately hold a design member 24, the second general part of indicia member 20, that is attached to the backing member 22. The shape and configuration of the backing member 22 depend largely on the shape and configuration of indicia member 20. Backing member 22 is structured in such a way, preferably, to reduce or eliminate air entrapment during casting or molding. One way of achieving this is to make backing member 22 in the form of a grid, such as a honeycomb structure. (See FIG. 2). In this embodiment, backing member 22 is preferably rounded, at least partially, in its bottom, as seen in FIG. 4. The rounding of backing member 22 assists in air bubbles moving past backing member 22 during the manufacture of the bowling ball, thus assisting in the elimination of entrapped air bubbles in the completed bowling ball.

Backing member 22 may be structured as rectangles, squares, circles, honeycomb, or other shapes, regular or irregular. These shapes may be a single line, a plurality of lines, or one or more solid blocks of material. The size and shape of backing member 22 will depend on the size, shape, and material used for the desired indicia, and it may also be used to reduce or eliminate air entrapment in the finished bowling ball 10.

As stated above, indicia member 20 includes design member 24. Design member 24 is attached to backing member 22, and the outer surface 23 of design member 24 is what is seen, at least primarily, as the indicia of bowling ball 10 after the ball 10 has been formed and sanded. Design member 24 may be tapered downwardly from the surface of the ball at various points so that it creates a wedge within outer layer 14 of ball 10. (See FIG. 5A). This wedge helps hold indicia member 20 in the ball and may also aid in the elimination of entrapped air. It is also contemplated that the design member 24 could be straight-walled or have walls tapering upwardly toward the surface of the ball, depending on the adhesion properties, air entrapment elimination needs, and the desired final appearance.

When initially formed, it is preferable for the outer surface 23 of design member 24 to have a plurality of knobbies 27. (See FIGS. 3 and 4). The knobbies 27 help eliminate air entrapment during manufacture of the ball 10 by prohibiting the outer surface 23 of design member 24 from sitting flush against the inside of the mold. The indicia members 20, with or without knobbies 27, helps ensure perfect centering of the core during the manufacture of the ball. Knobbies 27 are removed from the bowling ball during the finishing process. The outer surface 23 of design member 24 may also include grooves, lines, or other shapes raised above the outer surface of indicia member 20 or below the surface of indicia member 20 during the manufacturing process to help assist in the elimination of air entrapment, as discussed in more detail below.

Indicia member 20 is preferably preformed, that is, formed before manufacture of the ball, and can be formed by machining (milling or tooling), molding, or casting, or a combination thereof. It is preferable that indicia member 20 be open-casted as a single piece, but it is possible to initially form two or more pieces and join the pieces together to form the indicia member. It is also foreseen that indicia member 20 may be formed of two or more unattached pieces in close proximity to one another. Indicia member 20 is formed preferably by a two-piece open cast, that is, one piece that generally forms the design member 24 and the other that molds the backing member 22. However, indicia member 20 may be formed of any number of pieces of the cast or mold to adequately form the indicia member 20. The number of pieces of the cast or mold will depend on the size, shape, and number of colors of indicia member 20 as well as the molding or casting equipment used to form indicia member 20. It is contemplated that indicia member 20 could be formed by other means as well, such as by closed molding techniques. It is also foreseen that the indicia member 20 may be formed with different colored materials, such as by using partial mold-filling techniques.

Preferably, the indicia member 20 is the same material as the material of the outer layer of the bowling ball 10. However, it need not be the same material as the outer layer 14. Also preferably, the indicia member 20 is a thermoset plastic or a thermoplastic. More preferably, it is of vinyl ester, urethane, polyurethane, polyester, epoxy, urethane, a rubber compound, or a mixture of two or more of these. One specific substance that may be used is a mixture of polyol IS-20769B and isocyanate IS-20769A, both from ITWC, Inc., of Malcolm, Iowa, in a preferred ratio of 10:6. Indicia member 20 can be made of substances different than the outer layer of the ball 10, but should be made of a substance that is not brittle in nature; will withstand the manufacturing process of the bowling ball outer layer without tearing, cracking, or breaking; and will be durable enough to withstand typical amounts of bowling usage. In addition, such materials should preferably have a similar weight as the substance used in the outer layer 14.

Indicia member 20 also has posts 40. (See FIGS. 2-4). Posts 40 have a large diameter upper portion 42 and a smaller diameter lower portion 44, creating a shoulder 43 at their junction. As shown in FIG. 5, after the indicia member 20 is molded and allowed to cure and/or cool, and after the core 12 has been formed, indicia member 20 is attached to core 12. Indicia member 20 is preferably attached to core 12 by the use of posts 40 that are attached to, or are a part of, indicia member 20. In manufacture of the bowling ball, the smaller diameter lower portions 44 of posts 40 are inserted into pre-drilled holes in the core 12, and are preferably inserted as far as the shoulder 43 of the larger diameter upper portions 42. (See FIG. 5). The posts 40, along with knobbies 27, help center the core for greater balance of the finished ball. This configuration also leaves a gap between the backing member 22 and the outer surface of core 12. The gap may be very small (or even non-existent) ranging to nearly the entire thickness of the outer layer. During the manufacture of the outer layer 14, the gap will typically be filled in with whatever material is used for the outer layer 14. The gap between the outer edge of the core 12 and bottom of indicia member 20 minimizes the effect that the indicia member 20 has on the strength and durability of the ball by nearly full encasement of the core by outer layer 14 with only minimal exception being posts 40 upon which indicia member 20 is suspended. This configuration significantly decreases the stress on the indicia/outer layer interface caused by thermal expansion and contraction during curing cycles of the outer layer material. The stress force is distributed between the indicia member 20 and the outer layer 14 material adjacent the indicia member. If this layer of material between the core and indicia member is absent, all of the expansion and contraction forces are borne solely by the weak interface bond between the indicia member and the outer layer material at the sides of indicia member 20. Having this gap also enhances the resistance to cracking of the outer layer material around the indicia member.

Another way to attach the indicia member 20 to the core 12 is by using a hot melt adhesive. The hot melt adhesive can be applied to the backside 25 of indicia member 20. After the hot melt has been applied to the backside 25, indicia member 20 can be lightly pressed against core 12 so that indicia member 20 will adhere to core 12 during the manufacturing of the ball when the outer layer is formed over the core and indicia member 20. Other attachment means, including other types of adhesives or mechanical fasteners, may also be used to attach indicia member 20 to the core 12. Also, alternatively, the indicia member 20 could be attached to the mold used to form the outer layer 14, and be attached to the core 12 when the outer layer 14 is formed over the core 12.

A second embodiment of indicia member is denoted by the reference numeral 120 in the drawings. Indicia member 120 includes two general parts. (See FIGS. 6-9). The first is a backing member 122 that provides the basic structure and foundation of indicia member 120. The backing member 122 preferably includes a grid 136 that is included for support. Backing member 122 preferably includes enough cross-members 138 that backing member 122 can adequately hold the design member 124 that is attached to it. Backing member 122 is structured in such a way to reduce or eliminate air entrapment during casting or molding.

Backing member 122 may be structured as rectangles, squares, circles, or other shapes, regular or irregular. Backing member 122 also may include cross-hatching 140, 142 in the diagonal direction relative to cross-members 138 for additional support. (See FIG. 8). The particular design of the indicia member 120 and the substance from which both the design member 124 and the backing member 122 are made are factors in determining whether cross-hatching should be used. The size and shape of backing member 122 and whether cross-hatching is used, and how much of it is used, will depend on the size, shape, and material used for the desired indicia, and also to reduce or eliminate air entrapment in the finished bowling ball 10.

Figure 10:
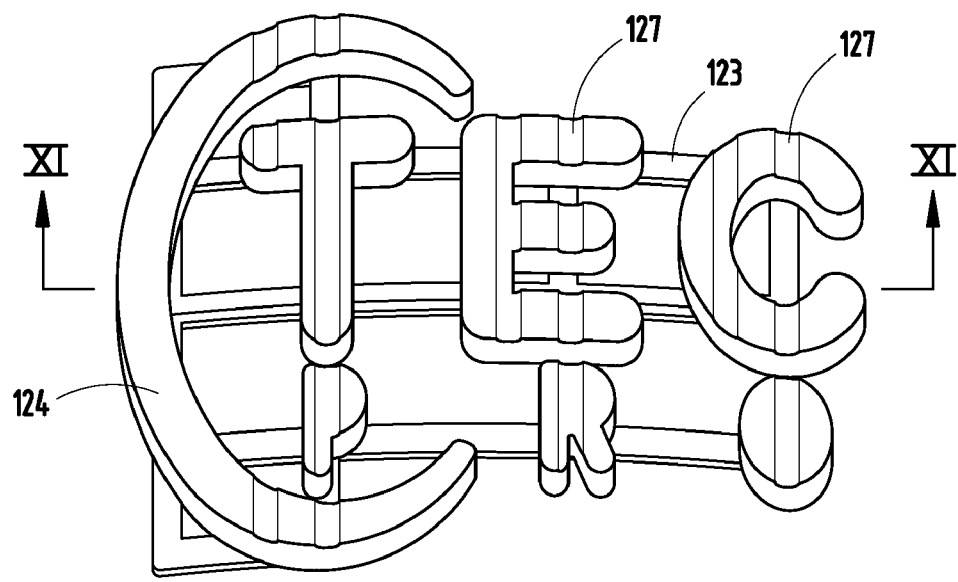
FIG. 10 is a top plan view of a portion of an indicia member.
Figure 11:
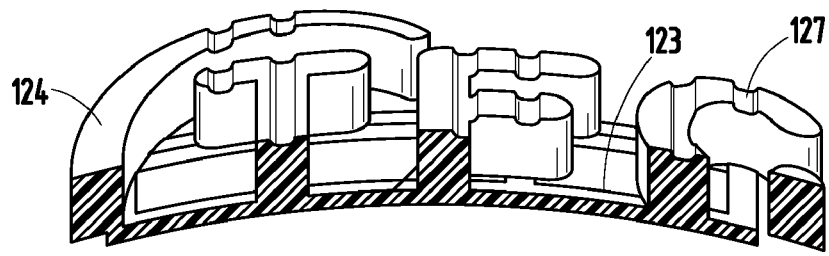
FIG. 11 is a cross section side elevational view of the portion of an indicia member shown in FIG. 10.

Indicia member 120 also includes design member 124. Design member 124 is attached to backing member 122, and the outer surface 123 of design member 124 is what will be seen, at least primarily, as the indicia of bowling ball 10 after the ball 10 has been formed and sanded. It is preferable that the design member 124 is tapered downwardly from the surface of the ball at various points so that it creates a wedge within outer layer 14 of ball 10. (See FIG. 5A). The angle of the outer sides of design member 24 are preferably at an angle to each other such that they flair away from each other the closer to the center of the ball they are. This wedge helps hold indicia member 120 in the ball and may also aid in the elimination of entrapped air. It is also contemplated that the design member 124 could be straight-walled or have walls tapering outwardly, depending on the adhesion properties, air entrapment elimination, and the desired final appearance. When initially formed, it is preferable for the outer surface 123 of design member 124 to have knobbies, similar to those shown in FIGS. 3-4, or a plurality of grooves 127 (see FIGS. 10, 11). The grooves 127 help eliminate air entrapment, both in the casting or molding process and during manufacture of the ball 10. These grooves 127 are removed from the bowling ball during the finishing process.

Indicia member 120 can be formed in the same manner as described above for the indicia member 20. Like indicia member 20, it is preferable that indicia member 120 be open-casted as a single piece, and formed preferably from a two-piece open cast. It is also contemplated that the indicia member 120 may be formed by other manufacturing methods and may have multiple colors, such as by using partial mold-filling techniques.

Also, it is preferable that indicia member 120 be the same material as the material of the outer layer of the bowling ball 10, but it is not essential. When indicia member 120 is formed, sprues 126 may be formed that extend from indicia member 120. (See FIG. 9). The sprues 126, or a portion of them, may or may not be used as attachment means, which will be discussed below.

Figure 12:
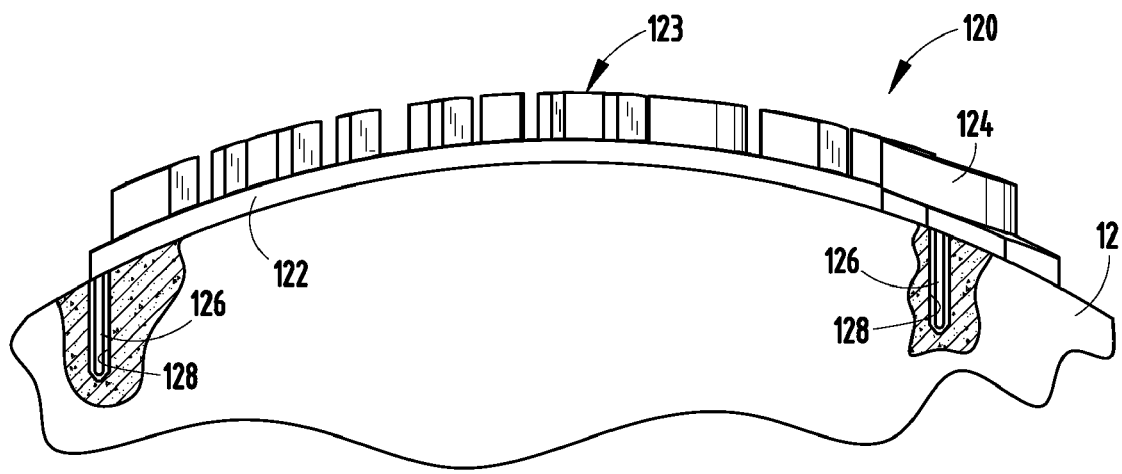
FIG. 12 is a side elevational view of a portion of a bowling ball core and the indicia member of FIG. 6.

As shown in FIG. 12, after the indicia member 120 is molded and allowed to cure and/or cool, and after the core 12 has been formed, indicia member 120 is attached to core 12. Indicia member 120 is preferably attached to core 12 by using a hot melt adhesive. The hot melt adhesive can be applied to the backside 125 of indicia member 120. After the hot melt has been applied to the backside 125, indicia member 120 can be lightly pressed against core 12 so that indicia member 120 will adhere to core 12 during the manufacturing of the ball when the outer layer is formed over the core and indicia member 120. If the sprues 126, or portions thereof, are left attached to indicia member 120, the sprues 126 can be used as a means to attach indicia member 120 to core 12. If the sprues 126 are used to attach indicia member 120, the same number of holes 28, or at least as many as there are sprues 126, should be drilled into core 12. Holes 28 should be positioned so that each sprue 126 can fit into a respective hole 28. (See FIG. 12). The size of the holes 28 are preferably only slightly larger than the diameter and length of the respective sprue 126. Thus, the sprues 126 will fit snugly within holes 28 and only the minimum amount of material will be removed from the core 12. After holes 28 are drilled into core 12, indicia member 120 can be attached to core 12 by aligning sprues 126 with holes 28 and pressing indicia member 120 until it reaches the desired final position, either leaving a gap between the outer surface of the core and the backside 125 of indicia member 120 or when the backside 125 of indicia member 120 is abutting core 12.

Other attachment means, including other types of adhesives, posts, or mechanical fasteners, may also be used to attach indicia members 20 and 120 to the core 12. Also, alternatively, the indicia members 20 and 120 could be attached to the mold used to form the outer layer 14, and be attached to the core 12 when the outer layer 14 is formed over the core 12.

Figure 13:
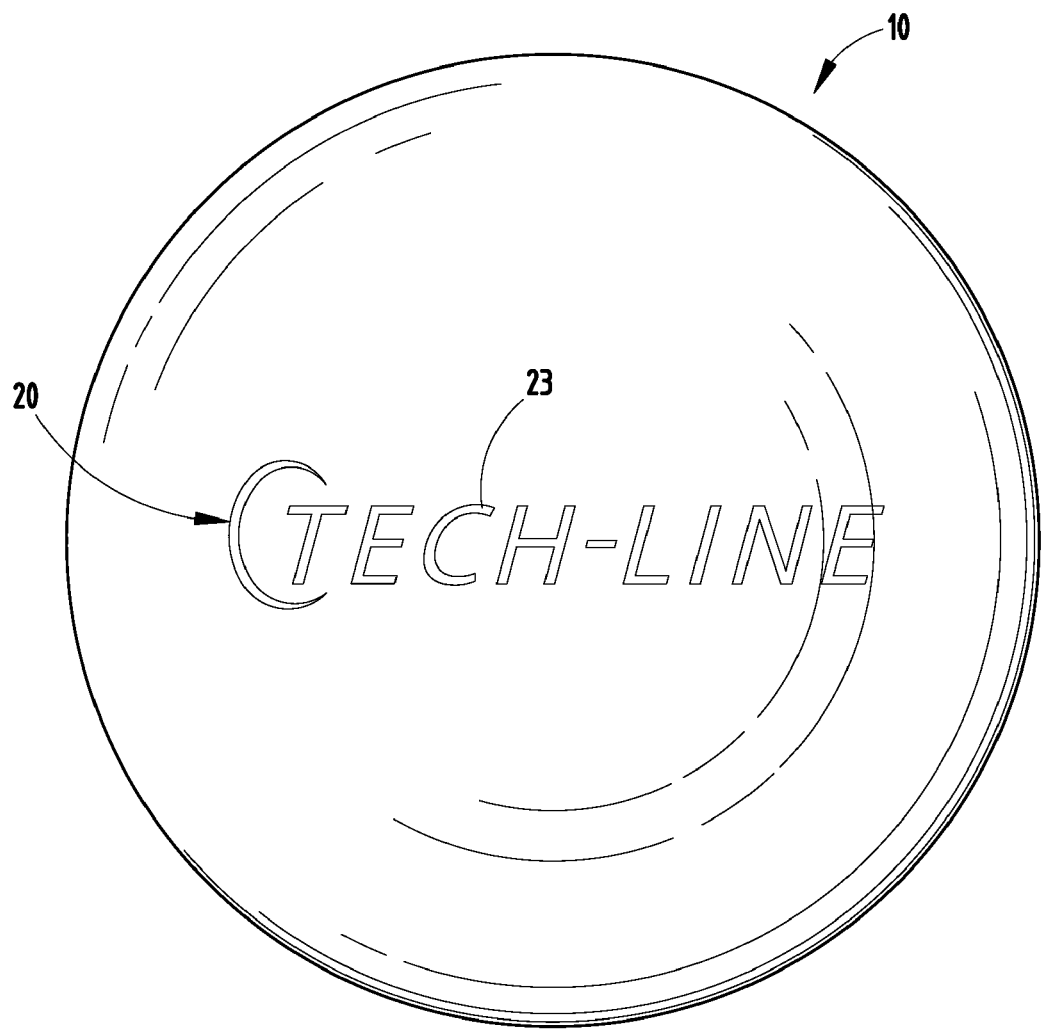
FIG. 13 is a bowling ball of the present invention, showing the indicia member.

After indicia member 20 or 120 is attached to core 12, the outer layer 14 of bowling ball 10 is then formed around the core 12 and indicia member 20 or 120. The outer layer 14 is formed by standard means known in the industry and to those of skill in the art, and is typically formed of polyurethane. Polyester, epoxy, and other types of thermosets or thermoplastics, as well as metals and other solids, can be used as well. After the outer layer is formed about the core and the indicia member, the ball is then finished by lathing, grinding, sanding, and/or polishing to a smooth finish, leaving the outer surface of the indicia member visible. (See FIG. 13). Because the indicia member is ground and sanded at the same time as the outer layer 14, the outer side of the indicia member is flush with the outer surface of ball 10. Multiple indicia members 20 or 120 may be used with the same ball.

Figure 14:
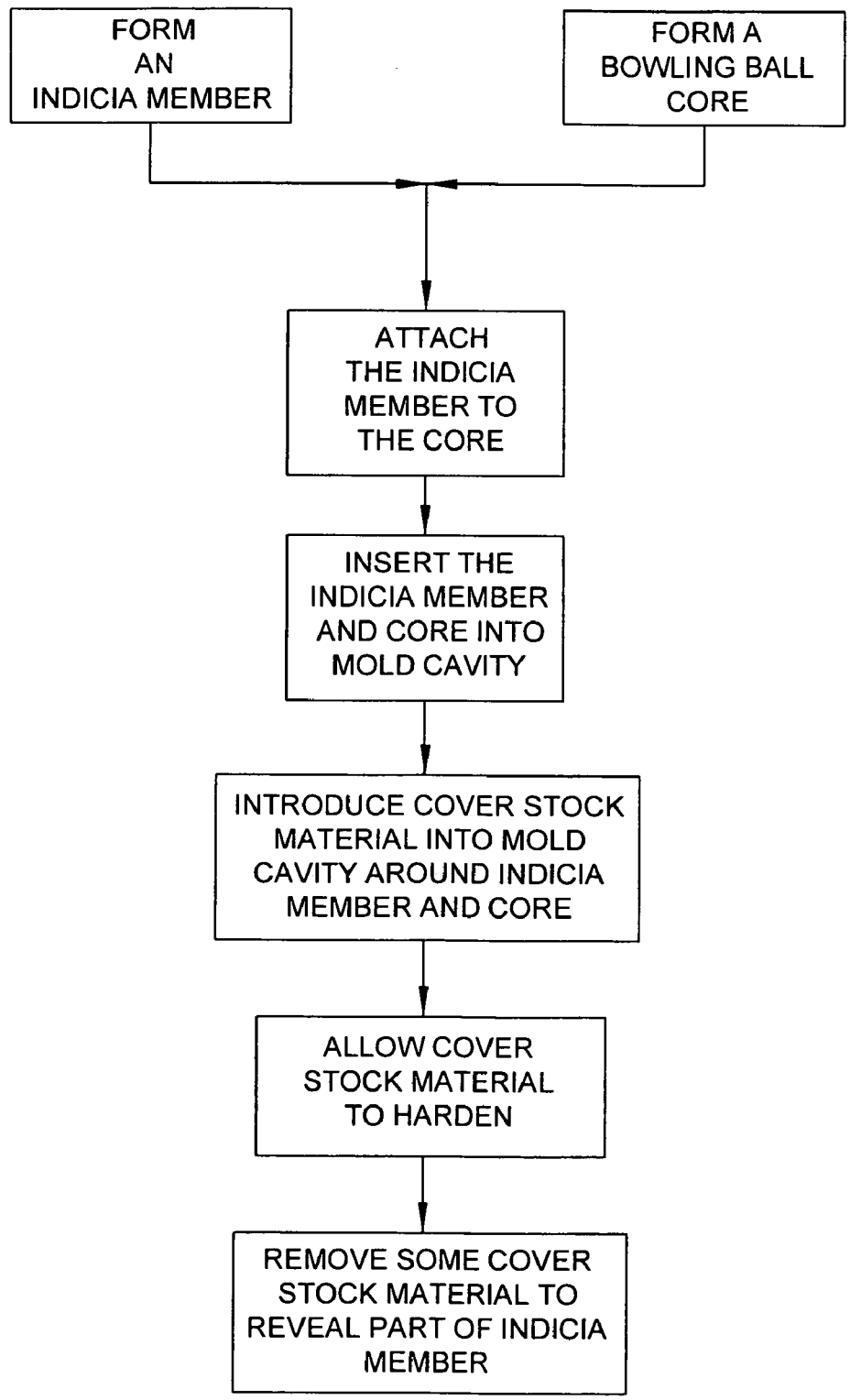
FIG. 14 is a flowchart of a method of manufacturing a bowling ball of the present invention.

FIG. 14 shows a flowchart of the general steps of the preferred method of manufacturing a bowling ball. An indicia member and a bowling ball core are preformed (i.e. formed before insertion into a mold for forming a bowling ball). Although not essential, the indicia member is preferably attached to the core, and then the core and indicia member are inserted into a mold cavity, with the indicia member contacting the inner wall of the mold. Cover stock material is then introduced into the mold cavity and around the indicia member and core. After the cover stock material is inserted completely, the material is allowed to harden. Once hardened, some of the cover stock material is removed—in the finishing process—to reveal part of the indicia member.

The method and resultant bowling ball of the present invention contain a number of advantages. This method of making the bowling ball with indicia provides ease of manufacture, specifically due to reduced number of steps and reduced cost, and allows use of a wide array of possible indicia with a wide array of indicia possibilities, including multi-colored and complex-shaped indicia. The resultant bowling ball has a resistance to depreciation of appearance and no reduction in performance as it has no bearing on the weight or characteristics of the bowling ball, such as its grip or hook. Also, because indicia member 20 or 120 is of the same material, or a material with a similar weight, as outer layer 14, indicia member 20 or 120 does not cause any weight balance issues with respect to ball 10.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. A method of manufacturing a bowling ball, comprising the steps of:
    providing a mold disposed to form the general structure of an unfinished bowling ball, the mold having an outer shell with an inner wall;
    providing a molding material;
    forming an indicia member configured to be part of a bowling ball, the indicia member having an initial outer surface with knobbies extending outwardly therefrom;
    placing the indicia member within the mold;
    positioning the indicia member within the mold such that the knobbies are in contact with the inner wall of the outer shell of the mold;
    inserting the molding material into the mold around the indicia member;
    allowing the molding material to harden to form an unfinished bowling ball; and
    removing material from the unfinished bowling ball to remove the knobbies and to reveal the indicia member.

2. The method of claim 1, further comprising the step of placing a ball core into the mold after the step of forming an indicia member.

3. The method of claim 2, wherein the core has an outer surface and the indicia member is suspended near the outer surface of the core and set off from the core, before the step of inserting molding material into the mold around the indicia member.

4. The method of claim 3, wherein the indicia member is suspended and set off from the core by the use of at least one post.

5. A method of manufacturing a bowling ball, comprising the steps of:
    providing a manufacturing machine having a cavity with an inner wall;
    providing a bowling ball core;
    forming a surface graphic having an outer body member, the outer body member having an outer surface with at least one projection extending therefrom;
    placing the bowling ball core into the cavity;
    placing the surface graphic into the cavity, the at least one projection of the outer body member being in contact with the inner wall of the cavity, the surface graphic being disposed in a position adjacent the core, with a gap between the outer body member of the surface graphic and the core;
    inserting material into the machine and covering the core and surface graphic to create a cover stock; and
    removing cover stock material such that a portion of the surface graphic is visible as an indicia at the surface of the bowling ball.

6. The method of claim 5, wherein the at least one projection is a plurality of knobbies to aid in the resistance of air entrapment during the method of manufacturing the bowling ball.

7. The method of claim 5, wherein the manufacturing machine is a two- or more piece mold.

8. The method of claim 5, further comprising the step of drilling holes into the core into which the surface graphic can be secured.

9. A method of manufacturing a bowling ball comprising the steps of:
- forming a graphic, the graphic having a body portion with a plurality of knobbies extending outwardly from the body portion and at least one leg depending from the body portion, the leg having a lower end and an upper end, the lower end and the upper end together defining a shoulder;
- forming a bowling ball core having an outer surface and at least one bore therein, the bore sized to be capable of receiving the lower end of the leg of the graphic;
- inserting the lower end of the at least one leg into the at least one bore of the core, configured such that the shoulder prevents the body portion from contacting the core;
- inserting the graphic and core into a mold cavity having an inner wall;
- positioning the graphic within the mold cavity such that the knobbies are in contact with the inner wall of the mold cavity;
- forming cover stock over the core and around the graphic while the graphic and core are in the mold cavity to create an initial exterior surface of a bowling ball; and
- removing material from the initial exterior surface of the bowling ball to remove at least a portion of the knobbies and to reveal part of the body portion of the graphic.

10. The method of claim 9, wherein the graphic is of at least one of urethane and epoxy.

11. The method of claim 9, wherein the bowling ball core is substantially spherical, and the graphic body portion has a bottom that is curved.

12. The method of claim 9, wherein the graphic body portion comprises a backing member for assisting in reduction or elimination of air entrapment during manufacture of the bowling ball.

13. An unfinished bowling ball comprising:
- a central core of a first substance, the core having a core exterior surface and at least one hole therein extending to the core exterior surface;
- an indicia member comprising a design element having an outer design surface, at least one post connected to the design element at least partially disposed within the core hole, and at least one knobbie extending outwardly from the outer design surface; and
- an outer layer of a second substance, the second substance of the outer layer encompassing the core and the design element, the second substance being of a consistency such that a portion of the outer layer may be removed by a lathing process, along with the at least one knobbie, to reveal the design member and form a smooth bowling ball exterior.

14. The unfinished bowling ball of claim 13, wherein the design element of the indicia member has a bottom, the design element bottom and the core exterior surface not in contact with each other.

* * * * *